United States Patent [19]
Deck et al.

[11] 3,807,077
[45] Apr. 30, 1974

[54] METHOD AND APPARATUS FOR PRE-HEATING STRUCTURAL SHAPES FOR WELDING

[75] Inventors: James R. Deck; Norman C. Howells, both of Conneaut, Ohio

[73] Assignee: Exomet Incorporated, Conneaut, Ohio

[22] Filed: Apr. 4, 1972

[21] Appl. No.: 240,943

[52] U.S. Cl. .................................. 432/10, 432/226
[51] Int. Cl. ............................................. F27d 13/00
[58] Field of Search ................ 432/1, 10, 225, 22 C

[56] References Cited
UNITED STATES PATENTS 2,526,249  10/1950  Martines .............................. 432/10
2,569,956  10/1951  Schiltknecht .................... 432/225 X
2,147,673  2/1939   Ronay .................................. 432/225

Primary Examiner—John J. Camby
Attorney, Agent, or Firm—James C. Simmons; Barry Moyerman

[57] ABSTRACT

A flexible exothermic assembly is secured to an article such as a pipe adjacent a joint and ignited thereby preheating the joint for welding. The exothermic assembly includes a flexible backing strip with fastening means to attach the strip to the shape with the exothermic carried by the strip and being so constructed as to be flexible. Method and apparatus are characterized in that the assembly is complete and ready for use without the need for auxiliary fasteners, insulation and the like.

10 Claims, 3 Drawing Figures

3,807,077

3,807,077

METHOD AND APPARATUS FOR PRE-HEATING STRUCTURAL SHAPES FOR WELDING

BACKGROUND OF THE INVENTION

This invention pertains to preheating of structural shapes for welding by means of an exothermic charge placed at or near the point of welding. In the construction industry and in particular in the construction of pipelines for cross country transmission of oil and gas the individual lengths of pipe are joined by welding. With certain piping materials such as alloy steel and under low ambient temperature conditions, it is necessary to preheat the abutting ends of the pipe being welded to prevent cracking of the weld or pipe due to thermal shock induced by the welding heat. Such preheating is usually in the temperature range of 150°F to 600°F., the temperature being dictated by the geometry, size, thickness, and composition of the structural shapes being joined and the ambient temperature at the welding site. Ambient temperature is a potential problem in construction projects such as the proposed 48 inch Trans-Alaska pipeline where welding would be carried on at ambient temperatures as low as −40°F.

The most prevalent method and apparatus for preheating structural shapes for welding requires oxy-fuel torches with the flame directed at the location of the joint. This operation can be done by hand or with a mechanized torch carriage held on the structural shape. Such devices are expensive, require auxiliary power, and usually require a long setup time. Hand heating is not desirable because of the non-uniformity of heating common to such operations.

Another method comprises using a shaped exothermic charge contained in a kit offered for sale by Exomet, Incorporated of Conneaut, Ohio, under the name EXO-PREHEAT. The EXO-PREHEAT kit contains shaped exothermic charges, insulation, sealing rings and fastening wires. Each kit is manufactured according to the geometry, size, material and temperature required and gives excellent results when used for the ordered purpose. Such kits are bulky and do require time to be installed on the structural shape being preheated for welding. For large projects such kits present a space, storage problem.

BRIEF DESCRIPTION OF THE INVENTION

In order to avoid the above-mentioned problems and to provide a self-contained, easily installed exothermic preheating assembly, it has been discovered that an exothermic charge can be supported on a flexible backing strip with the strip having buckling or like means to affix the strip to the structural shape and the exothermic is supported in a manner so that it can be shaped as the backing strip is applied. Using a device such as this provides rapid installation without the need for auxiliary apparatus. The assembly carries its own insulation and can be packaged in a synthetic material by the known "shrink-pack" method to facilitate storage and handling. Such strips can be fastened together for additional length or used in the superimposed relationships.

Therefore, it is the primary object of this invention to provide a method and apparatus for preheating structural shapes for welding.

It is another object of this invention to provide a flexible exothermic charge for preheating structural shapes.

It is still another object of this invention to provide a self-contained exothermic assembly for rapid installation to structural shapes.

It is yet another object of this invention to provide a method for preheating structural shapes prior to welding.

These and other objects of the invention will be apparent to those workers in the art in view of the foregoing and the following description of the invention.

DETAILED DESCRIPTION OF THE PREFERRED EMBODIMENT

Figure 1:
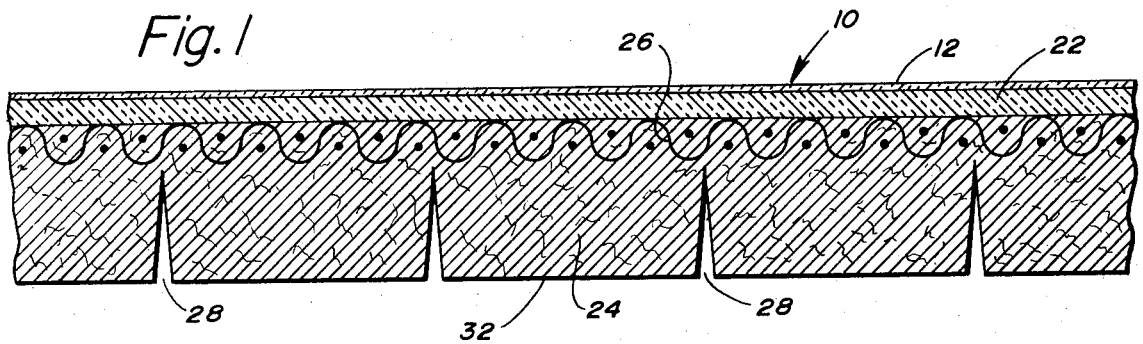
FIG. 1 is a fragmented cross-sectional view of the exothermic assembly according to the invention.
Figure 2:
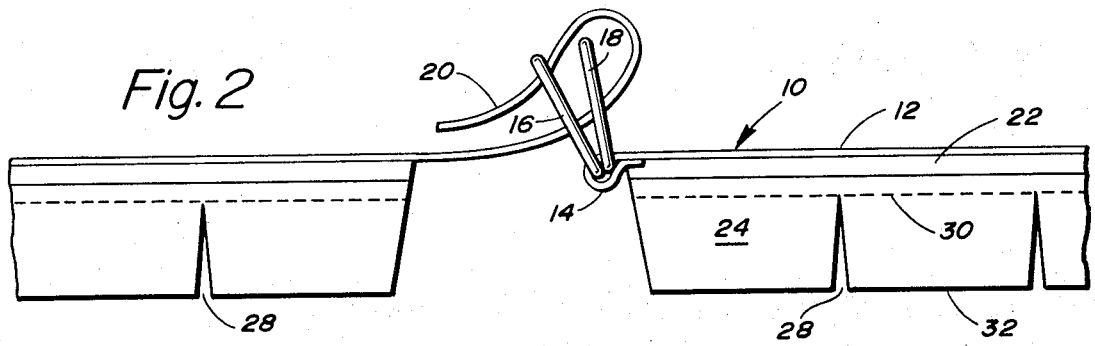
FIG. 2 is a fragmented front view of the exothermic assembly showing one embodiment of the fastening means associated with the backing strip.

Referring to the drawing and in particular FIGS. 1 and 2 the exothermic assembly shown generally as 10 includes a flexible backing strip 12. The backing strip can be of any flexible material such as cloth, heavy paper, plastic film, leather, steel banding, tape and the like; an asbestos tape manufactured by Nicotex, Incorporated and sold under the name ASBESTOS TAPE Nx116B being preferred. The backing strip 12 has a loop 14 formed on one end which carries two rings 16, 18 as shown in FIG. 2. These rings when arranged with the other end 20 of backing strip 12 as shown in FIG. 2 form a buckled closure as illustrated. The backing strip 12 can contain wires on either end that can be twisttied to hold the strip in place, clips, snap buttons or any other well known cloth-type fastening (joining) means in place of the buckle rings 16, 18 shown in FIG. 2.

Disposed on the flexible backing 12 is a layer of asbestos or other insulating material 22 the form and thickness of which are selected to retain the heat in the area of the structural shape being contacted by the exothermic charge. One type of asbestos material used for layer 22 is ¼ inch ROLL FELT sold by Johns Manville. Other insulating materials such as fiberglass, mineral wool and the like can be used, however asbestos is preferred.

Figure 3:
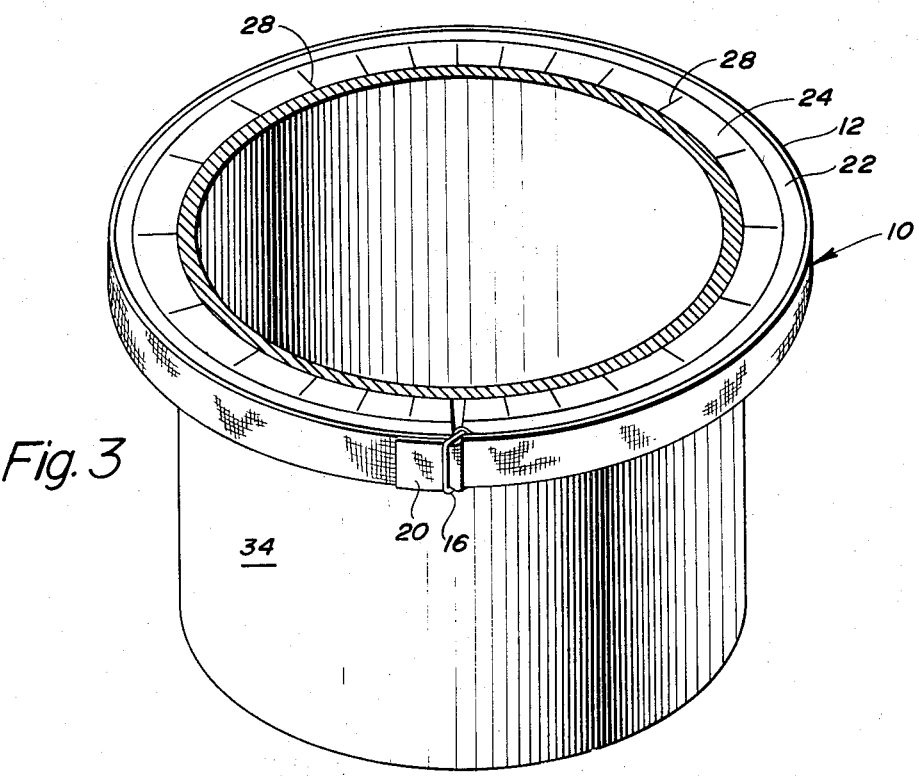
FIG. 3 is an isometric view of a pipe with the exothermic assembly in position for effecting preheating of the pipe.

Affixed to the asbestos layer 22 by cement or other adhesive is a molded exothermic charge 24. The charge 24 has imbedded therein a flexible wire screen 26 having openings of approximately three-quarters of an inch. Screen 26 shown diagrammatically in FIG. 1 for clarity is actually located at or adjacent the base of V-shaped notches 28 as shown by ghost line 30 of FIG. 2 to support the exothermic 24 and in conjunction with notches 28 render it flexible. Notches 28 are constructed transverse to the longitudinal axis of the flexible backing strip 12 with the apex at or adjacent screen 30 and opening on the exposed surface 32 of exothermic 24. When the assembly 10 is fastened to a structural shape such as pipe 34 of FIG. 3 the grooves 28 enable the exothermic charge 24 to uniformly surround the area of pipe 34 being heated. The assembly 10 is shown attached to the end of a pipe 34, however in actual use the assembly 10 would be spaced away from the edge of the pipe 34. After attachment to pipe 34 the assembly can be provided with fuses (not shown) at several locations to facilitate ignition of the charge 24 or the exothermic charge 24 can be ignited directly by means of a flare or torch. The assembly can be covered with a plastic wrapping put on by the shrink-pack method. A plastic covering applied in this manner aids in holding the exothermic charge 24, insulating layer 22, and flexible backing 12 together and at the same time provides a waterproof assembly.

Exothermic charge 24 is preferably a mixture molded according to the following broad compositional ranges:

| Constitutent | Percent By Weight |
|---|---|
| Fuel | 13–55 |
| Binder | 2–9 |
| Oxidizing Agent | 7–30 |
| Flux | 1–6 |
| Filler | 0–50 |
| Fiber | 3–25 |

In the above compositions the preferred fuel is finely divided aluminum in the form of 300 mesh (Tyler Standard Sieve Series) powder, grindings of less than 100 mesh and chopped foil. The particle size can be adjusted depending upon the burning rate desired; e.g., faster burn requires more of the finer particle size aluminum. The binders can include starches, phenolic resins and/or dextrine. Oxidizing agents are preferably oxides of Iron ($Fe_2O_3$, $FeO$, or $Fe_3O_4$) in the form of a mixture called millscale. To facilitate the overall reaction a portion of the iron oxide can be replaced by a strong oxidizer such as sodium nitrate, aluminum nitrate, sodium chlorate, potassium chlorate and the like. Fluxes can be selected from those materials that will cleanse the aluminum thus permitting it to burn and include cryolite, potassium fluoroborate, potassium zirconium fluoride, aluminum fluoride or other fluorine compositions. Fillers include ground firebrick, aluminum oxide, sand, fireclay, and refractory oxides. The fiber is included to give the molded exothermic a degree of impact resistance and can be selected from the group consisting of asbestos, cloth, mineral wool, glass, synthetic yarn fibers or mixtures thereof.

A preferred exothermic composition is:

| Constitutent | Percent By Weight |
|---|---|
| Aluminum Powder | 21.9 |
| Aluminum Foil,Chopped | 10.4 |
| Starch | 4.2 |
| Millscale | 12.2 |
| Potassium Nitrate | 4.8 |
| Cryolite | 3.8 |
| Ground Firebrick | 29.2 |
| Asbestos Fiber | 13.5 |

In the above compositions, it is preferable that the aluminum powder pass a 300 mesh screen and the millscale pass a 100 mesh screen.

Manufacture of the exothermic assembly can be accomplished using a molding box provided with projections in the bottom corresponding to the grooves 28. After the box is filled with the exothermic mixture 24 a wire screen 26 is imbedded therein so it is adjacent the apex of the V. The asbestos layer 22 and backing strip 12 are then applied and the assembly dried and, if desired, covered with a plastic coating. It is also possible to apply the asbestos layer and tape after the exothermic is dried. The strips are formed in various lengths, approximately 2 inches wide, with a total thickness of about 1½ inches. The V-shaped grooves 28 are uniformly spaced on 2-inch centers and are approximately one-half inch deep and one-eighth inch wide at the surface 32 of exothermic charge 24.

Preliminary tests were conducted on a 48-inch diameter pipe having a ½ inch thick wall over which was placed two wraps of exothermic charge, made according to the above compositional data, 2 inches wide by one-half inch thick for a total thickness of 1 inch. The exothermic was covered by a ¼-inch thick asbestos strip and the entire assembly held in place by a continuous length of steel banding. The test was conducted with ambient temperature at 60°F., the exothermic completely reacting in 2 minutes 22 seconds after being ignited at twelve locations. Table I sets forth the temperature measurement taken on the inside surface of the pipe by means of temperature sensitive crayon marks drawn across the area beneath the preheat strip by 150°F., 200°F., 250°F., 300°F., and 400°F. temperature indicating crayons sold under the name TEMPIL-STIK by Tempil Division of Big Three Industries, Incorporated.

TABLE I

| Temperature (°F) | Time (minutes) | Temperature Band Width (inches) |
|---|---|---|
| 300 | 4 | 5.5 |
| 250 | 4 | 10.0 |
| 200 | 4 | 11.0 |
| 250 | 6.5 | 9.5 |
| 200 | 6.5 | 10.5 |
| 150 | 6.5 | 13.0 |
| 250 | 10.0 | 8.5 |
| 200 | 10.0 | 8.5 |

Another test was run using an exothermic layer 1½ inches thick, 2 inches wide placed 3¼ inches from a beveled end of a 48 inches ½-inch wall pipe. After reaction was started temperature measurements (using temperature indicating crayons) were made at the bevel and along the inner surface of the pipe from the center line of the exothermic toward the end of the pipe opposite that which was beveled and the results are as set forth in Table II.

TABLE II

| Temp. (°F) | Time (minutes) | Location of Measurement (TEMPILSTIK) |
|---|---|---|
| 400 | 4–6 | 1" from center line of exothermic |
| 300 | 4–6 | 5" from center line of exothermic |
| 250 | 4–6 | 5" from center line of exothermic |
| 150 | 4–6 | 6.5" from center line of exothermic |
| 315 | 7 | All around Bevel |
| 300 | 10.5–12.5 | 4" from center line of exothermic |
| 250 | 10.5–12.5 | 10" from center line of exothermic |
| 175 | 10.5–12.5 | 11" from center line of exothermic |
| 150 | 10.5–12.5 | 12" from center line of exothermic |
| 315 | 14 | Outside Surface of Bevel |
| 250/300 | 14 | Inside Surface of Bevel |
| 265 | 17 | Outside Surface of Bevel |
| 225 | 23 | Outside Surface of Bevel |

In the foregoing test, burn was completed in 2 minutes using more light-off points and after 23 minutes the area to be welded (outside bevel) was at 225°F.

Welding heat would raise this temperature, however as a static test the results are considered excellent.

Based upon the foregoing results exothermic assemblies such as shown in FIGS. 1 and 2 were constructed and tested on 20 inch diameter pipe having a ½ inch thick wall and a flat plate having a thickness of one-half inch. The exothermic assembly was placed 2 or 3 inches from the edge of the pipe or plate and ignited by means of an oxyacetylene torch. Tests were conducted at an ambient temperature of 80°F ±5°F and some tests were run with the test piece and the exothermic assembly cooled to between −20 and −40°F by using a Dry Ice alcohol mixture. Tables III through VI below set forth the data obtained with the number of ignition points and elapsed time calculated from the test data to show the effect on a 48-inch diameter ½ inch wall pipe. These calculations were accurate based upon the data obtained which showed a direct correlation between the smaller and larger diameter pipe.

TABLE III (This test conducted at ambient temperature)

Location of Exothermic Assembly—3" from end of plate
Initial Plate Temperature— +80°F
Initial Strip Temperature— +80°F
Burning Rate of Strip— 1 foot in 3.5 minutes
Maximum Temperature at edge of plate—390°F

| Number of Light-Off Points | Time for weld zone to reach 200°F | Time for weld zone to reach 150°F |
|---|---|---|
| 4 | 9.0 minutes | 6.8 minutes |
| 8 | 6.3 minutes | 4.1 minutes |
| 12 | 5.4 minutes | 3.2 minutes |
| 16 | 4.9 minutes | 2.7 minutes |

TABLE IV (Test run with both Exothermic Assembly and Plate at −40°F)

Location of Exothermic Assembly—3— from end of plate
Initial Plate Temperature— −40°F
Initial Strip Temperature— −40°F
Burning Rate of Strip— 1 foot in 4.5 minutes
Maximum Temperature of Strip at edge of plate— 330°F

| Number of Light-Off Points | Time for weld zone to reach 200°F | Time for weld zone to reach 150°F |
|---|---|---|
| 4 | 11.8 minutes | 9.8 minutes |
| 8 | 7.8 minutes | 5.8 minutes |
| 12 | 6.8 minutes | 4.8 minutes |
| 16 | 6.2 minutes | 4.2 minutes |

TABLE V (Test run with Exothermic Assembly at −40°F and plate at ambient temperature of +80°F)

Location of Exothermic Assembly—3" from end of plate
Initial Plate Temperature— +80°F
Initial Strip Temperature— −20°F
Buring Rate of Strip— 1 foot in 3.9 minutes
Maximum Temperature at edge of Plate— 350°F

| Number of Light-Off Points | Time for weld zone to reach 200°F | Time for weld zone to reach 150°F |
|---|---|---|
| 4 | 9.2 minutes | 8.0 minutes |
| 8 | 6.6 minutes | 5.4 minutes |
| 12 | 5.5 minutes | 4.3 minutes |
| 16 | 5.1 minutes | 3.9 minutes |

TABLE VI (Test run same as Table V)

Location of Exothermic Assembly— 2" from end of plate
Initial Plate Temperature— +80°F
Initial strip Temperature— <20°F
Burning Rate of Strip— 1 foot in 3.9 minutes
Maximum Temperature at edge of plate— 420°F

| Number of Light-Off Points | Time for weld zone to reach 200°F | Time for weld zone to reach 150°F |
|---|---|---|
| 4 | 7.4 minutes | 6.8 minutes |
| 8 | 4.5 minutes | 3.8 minutes |
| 12 | 3.5 minutes | 2.8 minutes |
| 16 | 3.0 minutes | 2.3 minutes |

In all of the above tests the maximum temperature immediately below the exothermic assembly did not exceed 450°F. With the exception of the test setout in Table IV, in which the plate was wet, the weld area remained above 200°F for approximately 25 minutes and above 150°F for approximately 32 minutes. The test represented in Table IV was made with the exothermic assembly and plate cooled to −40°F. The time to attain preheat temperatures shown in Table IV are longer because frost and water condensed on the cold test plate and the added heat necessary to evaporate the condensate prolonged the time to temperature at the edge of the test plate. Of course, in an ambient environment of −40°F this condition would not exist as shown by the data in Table V where only the exothermic assembly was precooled. The burning rate is reduced to some extent by low temperatures, however, this can be offset by increasing the number of light-off points. Time to achieve 200°F is almost halved by using 16 rather than 4 light-off points. As shown by a comparison of Tables V and VI moving the exothermic assembly closer to the weld zone results in a reduction of heating time.

The total weight of an exothermic assembly necessary to encircle a 48 inches diameter pipe would be 11 pounds. Tests show the assembly is as flexible at −40°F as it is at 80°F. The assembly can be shipped flat so that maximum weight of product can be shipped in a minimum volume.

The exothermic assembly 10 when covered with a plastic coating is waterproof, requires no special equipment for handling, requires no external power and will heat a bevel on a 48 inches diameter ½ inch wall pipe to 200°F in less than 5 minutes in an ambient temperature of −40°F.

Several modifications can be made to the assembly 10 to facilitate manufacturing. For example the backing strip 10 can be a narrow steel band fixed to insulating layer 22. The backing strip 12 could also be a metal imbedded in the insulation 22 or the backing strip 12 could be combined with the insulation into a unitary structure. In the latter case the backing strip would itself be the insulation.

Having thus described our invention what is desired to be secured by Letters Patent of the United States is set forth in the following claims.

We claim:

1. A flexible exothermic assembly for preheating of pipe and the like in the field prior to welding comprising in combination:
   a flexible backing strip;

means in said flexible backing strip for securing the backing strip to the object to be heated;

means in said backing strip for containing and concentrating heat buildup on the surface of the object being heated;

means in said backing strip to support an exothermic mixture, said exothermic mixture being formed on said backing strip and containing a series of grooves spaced apart from each other in a generally parallel relationship, said grooves generally perpendicular to a long axis of the backing strip, said grooves having a generally V-shaped cross-section with the apex of the V adjacent the backing strip and extending to the surface of the exothermic;

whereby said exothermic assembly can be rapidly secured to a structural shape without additional equipment and ignited to preheat the shape for welding.

2. An apparatus according to claim 1 wherein the entire assembly is covered with a flexible synthetic covering.

3. An apparatus according to claim 1 wherein the means for securing the strip includes a flexible belt and buckle.

4. An apparatus according to claim 1 wherein the means for securing the strip includes elongate wires on the strip, said wires carrying means at either end to enable an operator to twist-tie said wires.

5. An apparatus according to claim 1 wherein the backing strip includes an asbestos tape covered by an asbestos blanket at least one-fourth inch thick.

6. An apparatus according to claim 1 wherein the exothermic mixture includes a flexible support screen imbedded therein having ¾ inch mesh openings, said screen being located immediately below the apecies of the V-shaped grooves.

7. An apparatus according to claim 1 wherein the grooves in the molded exothermic are spaced on approximately 2-inch centers.

8. An apparatus according to claim 1 wherein the exothermic is molded to a thickness of between 1 and 2 inches.

9. A method of preparing a structural shape for welding by preheating the area to be welded to a temperature of at least 200°F by means of an exothermic assembly, said method comprising the steps of:

providing a flexible support strip having a length equal to the circumference of the shape to be heated, said support strip including means to fasten the strip to the shape being heated;

disposing a layer of insulating material on said support strip to contain and direct the heat to the desired surface area of the shape being heated;

disposing a shaped exothermic on said backing over said insulating layer, said shaped exothermic having a plurality of transverse equally spaced V-shaped grooves therein said grooves opening on the surface of said exothermic and having their apecies at or near said insulating materials;

covering said exothermic, insulating and backing materials with a thin flexible covering;

affixing the covered exothermic assembly to the structural shape at the area to be heated;

igniting the exothermic assembly at, at least, one location; and allowing the exothermic reaction to proceed to achieve the desired temperature in the shape being heated.

10. A method according to claim 9 wherein ignition aids are applied to the assembly during installation, said aids including fuses, ignition paste and the like.

* * * * *